(12) United States Patent
Mohebbi

(10) Patent No.: US 7,236,788 B2
(45) Date of Patent: Jun. 26, 2007

(54) SOFT HAND-OFF IN CELLULAR MOBILE COMMUNICATIONS NETWORKS

(75) Inventor: Behzad Mohebbi, Tustin, CA (US)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 11/025,006

(22) Filed: Dec. 29, 2004

(65) Prior Publication Data

US 2005/0113093 A1 May 26, 2005

Related U.S. Application Data

(63) Continuation of application No. 09/807,878, filed as application No. PCT/GB99/03550 on Oct. 27, 1999.

(30) Foreign Application Priority Data

Oct. 29, 1998 (GB) .................................. 9823736.5

(51) Int. Cl.
*H04Q 7/20* (2006.01)
*H04Q 7/00* (2006.01)
(52) U.S. Cl. ...................... 455/437; 455/436; 455/442; 455/67.11; 455/438; 455/439; 370/331; 370/328; 370/332
(58) Field of Classification Search ................ 455/436, 455/442, 437, 438, 439, 67.11; 370/328, 370/331, 320, 321
See application file for complete search history.

(56) References Cited

U.S. PATENT DOCUMENTS

| 5,101,501 A | 3/1992 | Gilhousen et al. |
| 5,267,261 A | 11/1993 | Blakeney et al. |
| 5,586,170 A | 12/1996 | Lea |
| 5,627,880 A * | 5/1997 | Rozanski et al. ........... 370/335 |
| 5,649,290 A * | 7/1997 | Wang ......................... 370/332 |
| 5,682,601 A | 10/1997 | Sasuta |
| 5,822,699 A | 10/1998 | Kotzin et al. |
| 5,940,380 A * | 8/1999 | Poon et al. .................. 370/330 |
| 5,960,352 A * | 9/1999 | Cherpantier ................ 455/451 |
| 6,009,332 A | 12/1999 | Haartsen |
| 6,151,502 A | 11/2000 | Padovani et al. |
| 6,161,013 A | 12/2000 | Anderson et al. |
| 6,195,551 B1 * | 2/2001 | Kim et al. .................. 455/436 |
| 6,519,456 B2 | 2/2003 | Antonio et al. |
| 2001/0046863 A1 * | 11/2001 | Rinne et al. ................ 455/442 |

FOREIGN PATENT DOCUMENTS

| EP | 0 347 396 | 12/1989 |
| EP | 0 369 535 | 5/1990 |
| EP | 0 501 808 | 9/1992 |
| GB | 2 225 196 | 5/1990 |
| GB | 2 327 013 | 1/1999 |
| WO | WO 98 35511 | 8/1998 |

* cited by examiner

*Primary Examiner*—George Eng
*Assistant Examiner*—Huy Phan
(74) *Attorney, Agent, or Firm*—Katten Muchin Roseman LLP

(57) ABSTRACT

In a call setup process for setting up a call for a mobile station of the network, respective uplink and downlink channels are allocated between the mobile station and a first one of a plurality of base transceiver stations of the network. The mobile station and at least one further base transceiver station of the plurality, neighbouring the said first base transceiver station, are provided with call setup information for use by the mobile station and the or each further base transceiver station to allocate respective uplink and downlink channels between the further base transceiver station concerned and the mobile station.

27 Claims, 8 Drawing Sheets

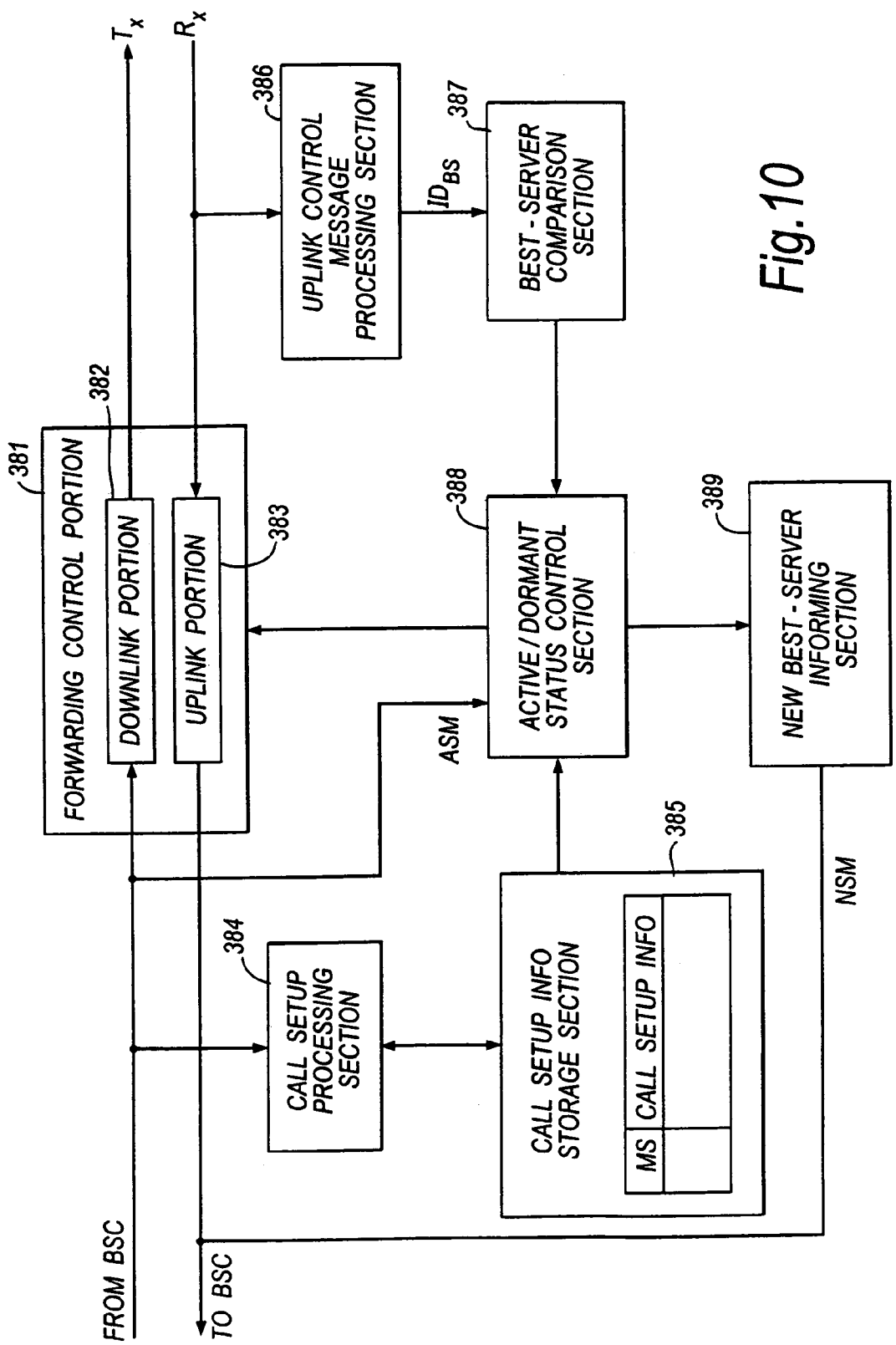

SOFT HAND-OFF IN CELLULAR MOBILE COMMUNICATIONS NETWORKS

CROSS-REFERENCE TO RELATED APPLICATION

This application is a continuation of U.S. application Ser. No. 09/807,873, filed on Jul. 12, 2001, now pending, which is a national stage of international application PCT/GB99/03550, filed Oct. 27, 1999 and claims priority from British Patent Application 9823736.5 filed on Oct. 29, 1998, which is herein incorporated by reference.

The present invention relates to cellular mobile communication networks, for example Code Division Multiple Access (CDMA) cellular networks. In particular the present invention relates to soft hand-off in networks having so-called "microcells" and other cells with a small coverage area.

FIG. 1 of the accompanying drawings shows parts of a cellular mobile telecommunication network according to the Telecommunication Industries Association (TIA)/Electronic Industries Association (EIA) Standard TIA/EIA/IS-95 of October 1994 (hereinafter "IS95"). Each of three base transceiver stations (BTSs) 4 (BTS1, BTS2 and BTS3) is connected via a fixed network 5 to a base station controller (BSC) 6, which is in turn connected to a mobile switching centre (MSC) 7. The BSC 6 serves to manage the radio resources of its connected BTSs 4, for example by performing hand-off and allocating radio channels. The MSC 7 serves to provide switching functions and coordinates location registration and call delivery.

Each BTS 4 serves a cell 8. When a mobile station (MS) 10 is in a so-called "soft hand-off" (SHO) region 9 where two or more cells overlap, a mobile station can receive transmission signals (downlink signals) of comparable strength and quality from the respective BTSs of the overlapping cells. Transmission signals (uplink signals) produced by the mobile station (MS) can also be received at comparable strengths and qualities by these different BTSs when the mobile station is in the SHO region 9.

FIG. 2 of the accompanying drawings shows a situation where the MS 10 is located within the SHO region 9, and is transmitting such uplink signals that are being received by plural BTSs 4. According to the IS95 standard, a BTS 4 that receives such an uplink signal from the MS 10 relays the signal to the BSC 6 via a dedicated connection line of the fixed network 5. At the BSC 6, one of the relayed signals is selected based on a comparison of the quality of each of the received signals, and the selected signal is relayed to the MSC 7. This selection is referred to as Selection Diversity.

Similarly, FIG. 3 of the accompanying drawings shows a situation where the MS 10 is located within the SHO region 9 and is receiving downlink signals from plural BTSs 4. According to the IS95 standard, downlink signals received by the BSC 6 from the MSC 7 are relayed to all BTSs 4 involved in the soft hand-off via respective connection lines of the fixed network 5, and subsequently transmitted by all the BTSs 4 to the MS 10. At the MS 10 the multiple signals may be combined, for example, by using maximum ratio combination (MRC), or one of them may be selected based on the signal strength or quality, i.e. using Selection Diversity as for the uplink case.

In contrast to, for example, Global System for Mobile Communication (GSM) networks, in CDMA networks each BTS 4 transmits at the same frequency. Consequently, careful control of transmission power must be maintained to minimise interference problems.

Signals are transmitted as a succession of frames according to the IS95 standard. As FIG. 4 of the accompanying drawings shows, each frame is of duration 20 ms, and comprises sixteen 1.25 ms time slots. In each time slot several bits of user data and/or control information can be transmitted.

Power control of transmissions from the MS 10 to the BTSs 4 (uplink power control) in IS95 is achieved as follows. When a BTS 4 receives a signal from the MS 10 it determines whether a predetermined property of the received signal (for example absolute signal level, signal to noise ratio (SNR), signal-to-interference ratio (SIR), bit error rate (BER) or frame error rate (FER)) exceeds a preselected threshold level. Based on this determination, the BTS 4 instructs the MS 10 either to reduce or to increase its transmission power in the next time slot.

For this purpose, two bits in every time slot of a pilot channel (PCH) from the BTS 4 to the MS 10 are allocated for uplink power control (see FIG. 4). Both bits have the same value, and accordingly will be referred to hereinafter as the "power control bit" (or PCB) in the singular. The power control bit is assigned a value of zero by the BTS 4 if the MS 10 is required to increase transmission power by 1 dB, and a value of one if the MS 10 is required to decrease transmission power by 1 dB. The BTS 4 is not able to request directly that the MS 10 maintain the same transmission power; only by alternately transmitting ones and zeros in the power-control bit is the transmission power maintained at the same level.

When the MS 10 is in a SHO region 9, the MS 10 is required to make a decision on whether to increase or to decrease uplink transmission power based on a plurality of power control bits received respectively from the BTSs 4 involved in the soft hand-off. Consequently, an OR function is performed on all the power control bits. If the result of this OR function is zero then the MS 10 will increase power on uplink transmissions, and if the result is one then the MS 10 will decrease power on uplink transmissions. In this way, uplink transmission power is only increased if all BTSs 4 ask for an increase.

Power control of transmissions from the BTS 4 to the MS 10 (downlink power control) in IS95 is achieved as follows. When the MS 10 receives a downlink signal from a BTS 4 (or from each of a plurality of BTSs 4 in soft hand-off operation) via a traffic channel (TCH), the FER of that signal is calculated by the MS 10 which reflects the degree to which the traffic-channel signal has been corrupted by, for example, noise. This FER is then relayed by the MS 10 to the BTS 4 which transmitted the downlink signal concerned, and the BTS 4 uses this FER to decide whether to make any change to its downlink transmission power.

The soft hand-off system described above is effective in improving signal transmission between the MS 10 and the network when the MS 10 is located in regions of cell overlap near the boundaries of the individual cells. Signal quality in these regions when using a single BTS 4 may be relatively poor, but by making use of more than one BTS 4 the quality may be substantially improved.

However, as described later in the present specification in more detail, the IS95 soft hand-off system, in common with other hand-off algorithms and techniques, is designed and optimised to operate in a so-called macrocellular environment in which the or each antenna of each cell ("macrocell") is above the level of the average rooftop. Such a macrocell has a relatively large coverage area with generally uniform propagation characteristics across the cell or each sector of the cell.

Such macrocells are envisaged for the first phase of deployment of cellular networks, where the demand for network capacity is relatively low. However, as the demand for network capacity grows, because the network is subject to physical limits on spectrum availability, the capacity can only be increased by reduction of the cell "footprint", i.e. by cell-splitting or deployment of so-called "microcells".

In a microcell, the or each antenna is below the average rooftop. The propagation characteristics in such a microcell can be highly directional, providing, for example, propagation along individual streets.

In microcells and other small cells, because the cell coverage area is reduced, the soft hand-off system requirements become more onerous, and in particular the speed of operation of the soft hand-off system must be increased.

The problem of the small cell footprint is exacerbated by microcell propagation characteristics which effectively result in cells "appearing" and "disappearing" very quickly, for example as a mobile station travels around street corners. All cellular networks are designed to be capable of coping with significant variations in signal level as the mobile station is moving (these are sometimes referred to as "log-normal variations"), so as to enable the network to cope with radio shadows. However, in travelling around street corners in a microcellular environment, signal levels can rise or fall by as much as 30 dB, which is in excess of the log-normal variations which conventional networks are designed to accommodate.

In such situations, the mobile station, which needs to measure, average and report back signal strength for an active set of neighbouring cells involved in the soft hand-off, would require processing times which are in excess of reliable operation time for successful hand-off.

When a corner is taken by a mobile station in the microcellular environment, a new cell appears almost instantaneously, and the uplink and downlink signal levels associated with the serving cell may experience severe fading which could result in the loss of a reliable communication link for hand-off signalling, or in transmission at excessive transmit powers (20 to 30 dB) for a long duration. When it is considered that a large number of mobile stations can be in such hand-off situations simultaneously, the loss in network capacity due to excessively powerful transmissions could be severe.

It is therefore desirable to provide a soft hand-off system capable of sufficiently fast operation for use in microcells and other small cells.

According to a first aspect of the present invention there is provided a cellular communications network including: call setup means operable, in a call setup process for setting up a call for a mobile station of the network, to allocate respective uplink and downlink channels between the mobile station and a first one of a plurality of base transceiver stations of the network, and to provide the mobile station and at least one further base transceiver station of the said plurality, neighbouring the said first base transceiver station, with call setup information for use by the mobile station and the or each said further base transceiver station to allocate respective uplink and downlink channels between the further base transceiver station concerned and the mobile station; and hand-off control means operable initially, upon completion of the call setup process, to set the said first base transceiver station to an active state, in which its said uplink and downlink channels are in use, and to set the or each said further base station to a dormant state in which the uplink and downlink channels of the further base transceiver station concerned are not in use, the hand-off control means also being operable when, during the course of the call, it is determined that the mobile station should communicate with the, or one of the, further base transceiver stations, to employ such call setup information provided in the call setup process to bring about change of that further base transceiver station from the said dormant state to the said active state.

In such a network the change of serving BTS can be carried out desirably quickly because the necessary call setup information for the new serving BTS is provided in advance during the call setup process. Channel negotiation signalling between the or each further BTS can therefore be carried out at the time of call setup, making it easy to activate the new serving BTS when a change of BTS is required.

According to a second aspect of the present invention there is provided a mobile station, for use in a cellular communications network, including: call setup information receiving means, operable in a call setup process for setting up a call between the network and the mobile station, to receive from a first base transceiver station of the network call setup information for use by the mobile station to allocate respective uplink and downlink channels between the mobile station and at least one further base transceiver station of the network; call setup information storage means for storing the received call setup information; and hand-off control means operable initially, following completion of the said call setup process, to cause the mobile station to communicate with the said first base transceiver station and operable when, during the course of the call it is determined that the mobile station should communicate with the, or one of the, further base transceiver stations, to employ the stored call setup information received in the call setup process to activate the said uplink and downlink channels between the mobile station and that further base transceiver station.

According to a third aspect of the present invention there is provided a base transceiver station, for use in a cellular communications network, including: call setup information receiving means operable, in a call setup process for setting up a call between the network and a mobile station of the network that is currently being served by another base transceiver station of the network neighbouring the claimed base transceiver station, to receive call setup information relating to the call, for use by the claimed base transceiver station to allocate respective uplink and downlink channels between it and the mobile station; call setup information storage means for storing the received call setup information; and hand-off control means operable initially, following completion of the said call setup process, to maintain the claimed base transceiver station in a dormant state, in which the said uplink and downlink channels are not in use, and, when it is determined by the network that the mobile station should communicate with the claimed base transceiver station, to employ the stored call setup information received in the call setup process to change the base transceiver station from the said dormant state to an active state in which its said uplink and downlink channels are in use.

According to a fourth aspect of the present invention there is provided a communications method for use in a cellular mobile communications network, including the steps of: in a call setup process, for setting up a call for a mobile station of the network, allocating respective uplink and downlink channels between the mobile station and a first one of a plurality of base transceiver stations of the network, and providing the mobile station and at least one further base transceiver station of the said plurality, which further base transceiver station neighbours the said first base transceiver station, with call setup information for use by the mobile station and the or each said further base transceiver station to allocate respective uplink and downlink channels between the further base transceiver station concerned and the mobile station; after completion of the call setup process, initially setting the first base transceiver station to an active state, in which the said uplink and downlink channels between it and the mobile station are in use, and setting the or each further base transceiver station to a dormant state, in which the said uplink and downlink channels between the further base transceiver station concerned and the mobile station are not in use; and when, during the course of the call, it is determined that the mobile station should communicate with the, or one of the, further base transceiver stations, employing such call setup information provided in the call setup process to bring about change of that further base transceiver station from the said dormant state to the said active state.

According to a fifth aspect of the present invention there is provided a cellular communications network in which the same uplink channel and/or the same downlink channel is/are assigned by the network to a mobile station of the network for use in communicating with a plurality of base transceiver stations of the network, and the mobile station uses that/those same assigned channel(s) both before and after a hand-off operation in which the mobile station is handed off from one base transceiver station of the said plurality to another base transceiver station of the said plurality.

Reference will now be made, by way of example, to the accompanying drawings, in which:

FIG. 1, discussed hereinbefore, shows parts of a cellular mobile communications network according to IS95;

FIG. 2, also discussed hereinbefore, shows a schematic view for use in explaining processing of uplink signals in a soft hand-off operation performed by the FIG. 1 network;

FIG. 3, also discussed hereinbefore, shows a schematic view for use in explaining processing of downlink signals in such a soft hand-off operation;

FIG. 4, also discussed hereinbefore, illustrates the format of a time frame in the FIG. 1 network;

FIG. 10 shows in detail one part of the FIG. 9 base transceiver station;

Before describing preferred embodiments of the present invention, for a better understanding of the invention a conventional soft hand-off operation in a network according to IS95 will now be described in detail with reference to FIG. 5. In the FIG. 5 example, it is assumed, for the sake of simplicity, that only two base stations BTS A and BTS B will be involved in the soft hand-off operation.

Initially (step (i)), i.e. before the mobile station enters a soft hand-off region, it is assumed that the mobile station is being served by BTS A and has respective forward and reverse traffic channels allocated to it for communication with BTS A.

At this time, the mobile station measures the signal strength of a common control channel CCCH broadcast by the BTS (BTS B) in each cell of a predetermined group of cells neighbouring the cell of the currently-serving BTS A. Strength measurement messages, providing the results of these signal strength measurements, are transmitted (step (ii)) via the uplink traffic channel assigned to the mobile station (the reverse traffic channel) to the currently-serving BTS A.

Figure 1:
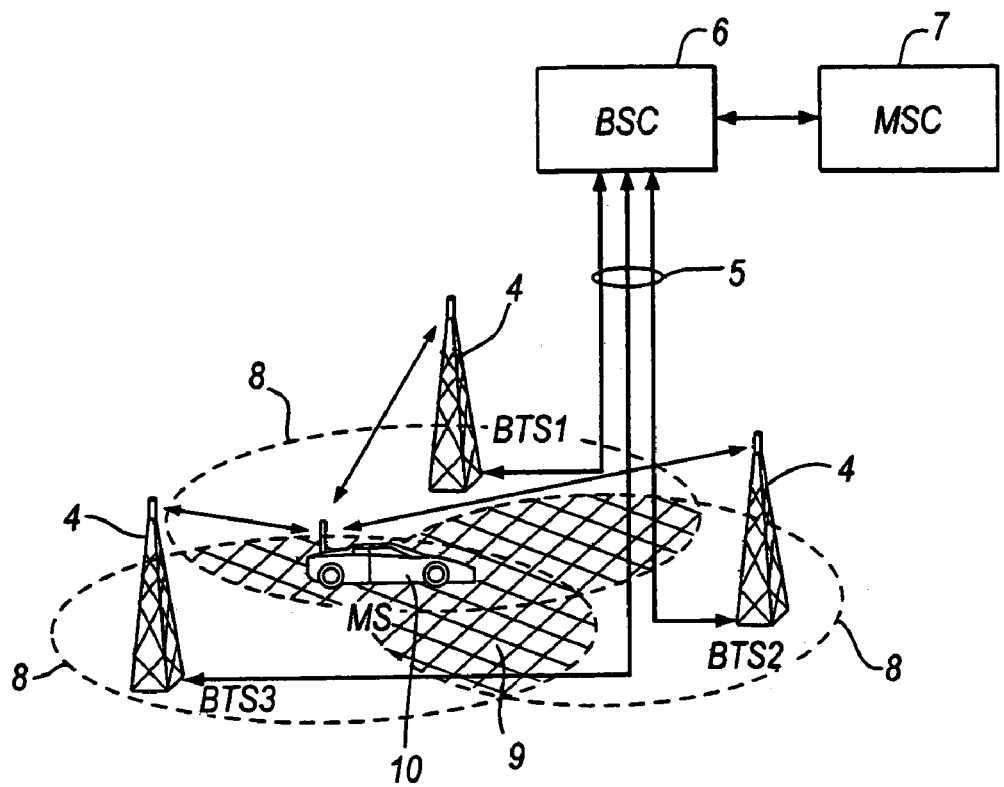
Figure 4:
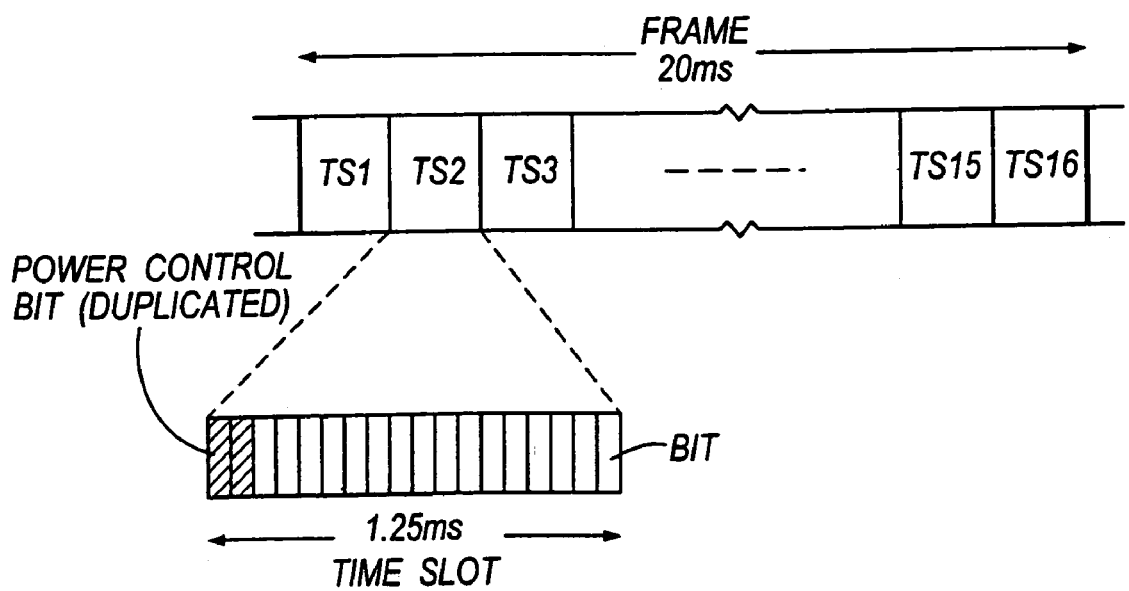
Figure 2:
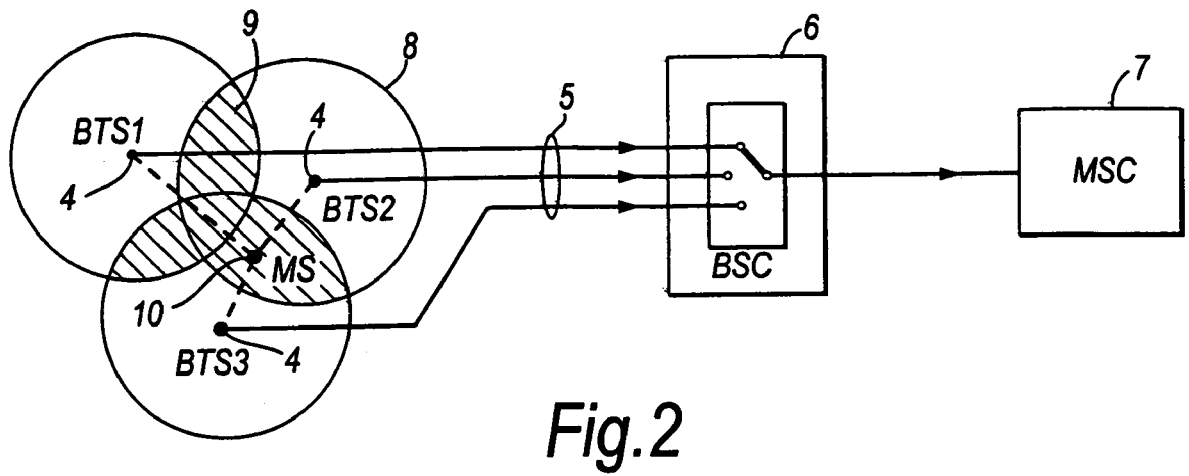
Figure 3:
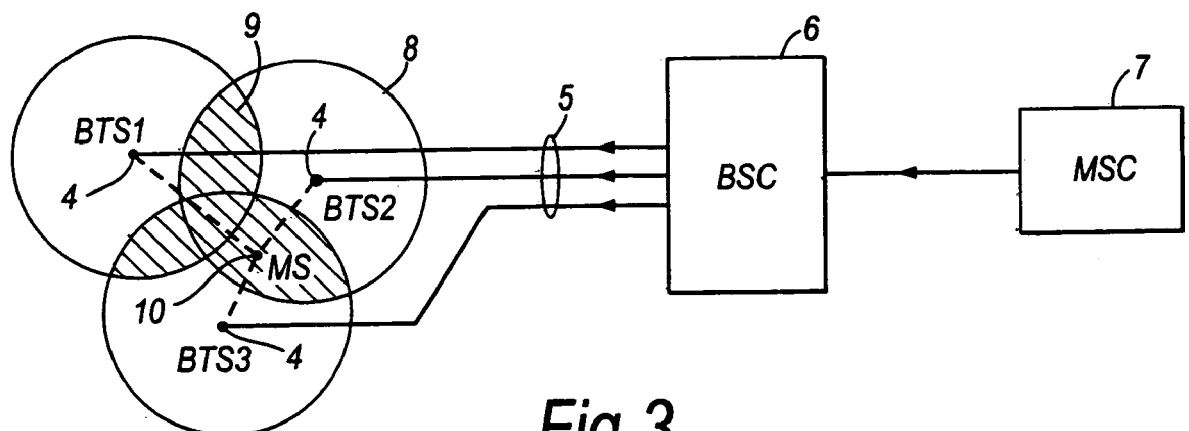

The strength measurement messages are received by the currently-serving base station BTS A and forwarded to the BSC (6 in FIG. 1). It is at the BSC that the decision is taken, based on the messages, to initiate a soft hand-off operation. The BSC also decides which BTSs to include in the set of active BTSs for a soft hand-off operation. The BSC informs the network components accordingly. Thus, as shown in FIG. 5, when the BSC detects that the signal strength of the CCCH (pilot "B" strength) of base station BTS B, as received at the mobile station, exceeds a threshold T_ADD, it makes the decision to form an active set for hand-off purposes made up of BTS A and BTS B, and informs both BTSs accordingly. Respective forward and reverse traffic channels between the MS and BTS B are allocated at this time.

In step (iii), BTS B begins transmitting traffic in the downlink direction (via the forward traffic channel) to the mobile station. From this point onwards, all downlink communications to the mobile station are performed by both base stations of the active set. Similarly, any uplink communication from the mobile station is received and processed by both base stations. The reverse traffic channel for BTS B is the same channel as the reverse traffic channel for BTS A to keep the transmitter circuitry in the MS simpler.

Thus, in steps (iv) and (v) respectively base stations BTS A and BTS B transmit a hand-off direction message via their respective forward traffic channels to the mobile station. In accordance with this handoff direction message, the mobile station "acquires" base station BTS B and uses the downlink signals from both base stations BTS A and BTS B to receive traffic from the network. The hand-off direction informs the mobile station to enter the "soft hand-off mode". The hand-off direction message contains information identifying the "active set" of BTSs for the soft handoff. For example, the message contains parameters identifying the forward traffic channels (i.e. the traffic channel "A", traffic channel "B", etc.) assigned to the mobile station. The parameters enable the mobile station to acquire and synchronise with the traffic channel "B" in this case. The mobile station activates its circuitry for receiving channel B.

In steps (vi) and (vii) respectively the mobile station transmits a hand-off direction message via the reverse traffic channel to BTS A and to BTS B. This message confirms that the mobile station has entered the soft hand-off mode. By step (viii) the mobile station resumes transmission and reception of data traffic.

From this point onwards, the mobile station is in soft hand-off. During the soft hand-off period, in which the mobile station is in communication with both BTS A and BTS B, continuous monitoring and reporting of the signal strengths of the BTSs (A and B) of the active set is performed. In addition, the mobile station continuously measures and reports the signal strengths of any remaining defined neighbouring cell not in the active set. The reports of signal strength are sent to each base station of the active set via the reverse traffic channel in the form of pilot strength measurement messages (steps (ix) and (x)).

The pilot strength measurement messages are forwarded by the receiving BTSs of the active set to the BSC which uses the messages to decide when to terminate the soft hand-off operation. At this time (steps (xi) and (xii)) both active BTSs transmit via their respective forward traffic channels a hand-off direction message, for example an instruction to the mobile station to drop the BTS A.

In step (xiii), in response to the received handoff direction message, the mobile station transmits via its reverse traffic channel a hand-off completion message. BTS A in response ceases transmission via its forward traffic channel to the mobile station.

The hand-off completion message is also received via the reverse traffic channel by the new serving base station BTS B (step (xiv)).

Figure 5:
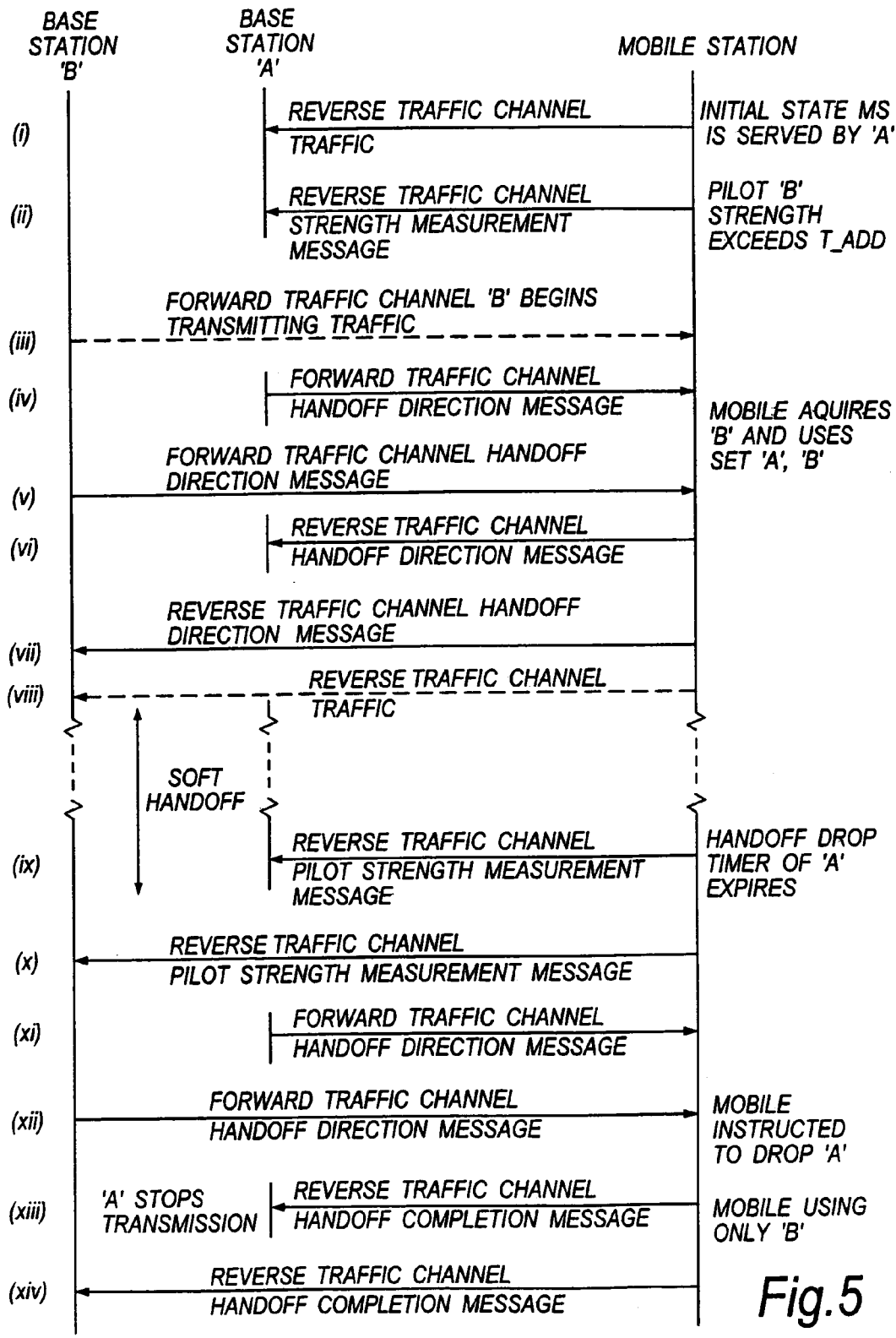
FIG. 5 shows a sequence of steps in the soft hand-off operation of the FIG. 1 network.

The FIG. 5 soft hand-off procedure has a number of problems when applied to microcells and other small cells.

1. Signal Strength Measurement Pre Soft Hand-Off

In the pre soft hand-off state, the mobile station must continuously measure the signal strength of the CCCH of each cell neighbouring the current cell. Usually, the network defines the group of neighbouring cells for any given currently-serving cell. The mobile station is required to monitor the signal strength of each such defined neighbouring cell. These measurements require acquisition of the cell CCCH (pilot channel), in order to identify the originating BTS. Also, it is necessary to average the measurements over a number of frames, so that the signal fluctuations caused by Rayleigh fading and (to some extent) log-normal fading (shadowing) are removed.

The measurement period in GSM networks is typically 480 ms and hand-off can take up to 4 seconds.

Although a 4 second hand-off delay may be acceptable in a macrocellular environment, in a microcellular environment it is found that the measurement process involves an averaging time that is too excessive, especially if there are a large number of defined neighbouring cells to monitor.

2. Signal Strength Measurement Messages for Neighbouring Cells Pre Soft Hand-Off The reporting of the measurements in 1. above is carried out using the dedicated physical control channel DPCCH or the dedicated physical data channel DPDCH. In either case, the messages generally-need to be protected (i.e. encoded with error detection/correction codes) and/or interleaved (usually more than speech services) so that correct reception is guaranteed, even under low signal-to-noise ratio (SNR) conditions that are commonly experienced on cell edges. Decoding of the messages then imposes a delay of at least one frame duration (e.g. 10 ms), and, if the messages are interleaved over several frames, more delays are experienced before a BTS can receive a complete strength measurement message.

Incidentally, the mobile station may not be required to report to the network in respect of all of the defined neighbouring cells. For example, in GSM networks, a mobile station is required for perform measurements for up to 12 defined neighbouring cells but is only required to report on six of them. Even so, the delays associated with the reports can be excessive for microcellular environments.

3. Pre Soft Hand-Off Signalling Between the Serving BTS (BTS A) and the MS

The mobile station is still required to exchange hand-off signalling with the serving BTS (steps (iv) and (vi)) Such signalling inevitably causes latency. Moreover, in a "street corner effect" in the microcellular environment, in which the serving cell suffers shadow fading in excess of 20 dB, high transmit power may be required both in the uplink and downlink directions. These high transmit powers, at best, lead to appreciable capacity loss. At worst, loss of the entire communications link between the network and the mobile station (i.e. a dropped call) may occur.

4. Pre Soft Hand-Off Signalling Between the Prospective New BTS (BTS B) and the MS Before communication with BTS B can commence, channel negotiation signalling is required. This signalling will cause further delay in the hand-off process. Moreover, since the mobile station is power-controlled by BTS A at this time, the transmit power for the signalling with BTS B may be far in excess of what is required for correct decoding, resulting in further loss of capacity.

5. Neighbouring Cell Signal Strength Measurements and Messages During the Soft Hand-Off Period During the soft hand-off period, continuous monitoring and reporting of the active and remaining defined neighbouring cells is required at the mobile station. For microcells and other small cells, the hand-off region may occupy a small area, such that the signal strength measurements and reports may not be effective.

6. Post Soft Hand-Off Signalling Between the Former Serving BTS (BTS A) and the MS The required post hand-off signalling with the former serving BTS (BTS A) may be unsuccessful in a microcellular environment if the mobile is under power control from the new serving cell B. To send the handoff completion message to BTS A, an excess transmit power may be required which can lead to further capacity loss.

7. Pre and Post Soft Hand-Off Signalling in the Fixed Network

Although the pre- and post-hand-off signalling in the fixed network does not constitute any overhead for the air interface, it still leads to further delays in the hand-off process. The accumulated effect of the fixed-network delays and the air-interface delays may be such that the hand-off process becomes unsuitable for microcells and other small cells. Furthermore, to reduce the required signalling in the fixed network, thresholds and hand-off hysteresis need to be used (to reduce the "ping pong" effect of continual BTS swapping), which measures may themselves lead to appreciable loss of overall performance.

8. Fixed Network Backhaul

The conventional soft hand-off techniques require constant communication with a number of cells which leads to significant backhaul requirements in the fixed network.

A soft hand-off procedure in a cellular communications network embodying the present invention will now be described with reference to FIG. 6. The FIG. 6 procedure is particularly suitable for use in a microcellular environment.

Figure 6:
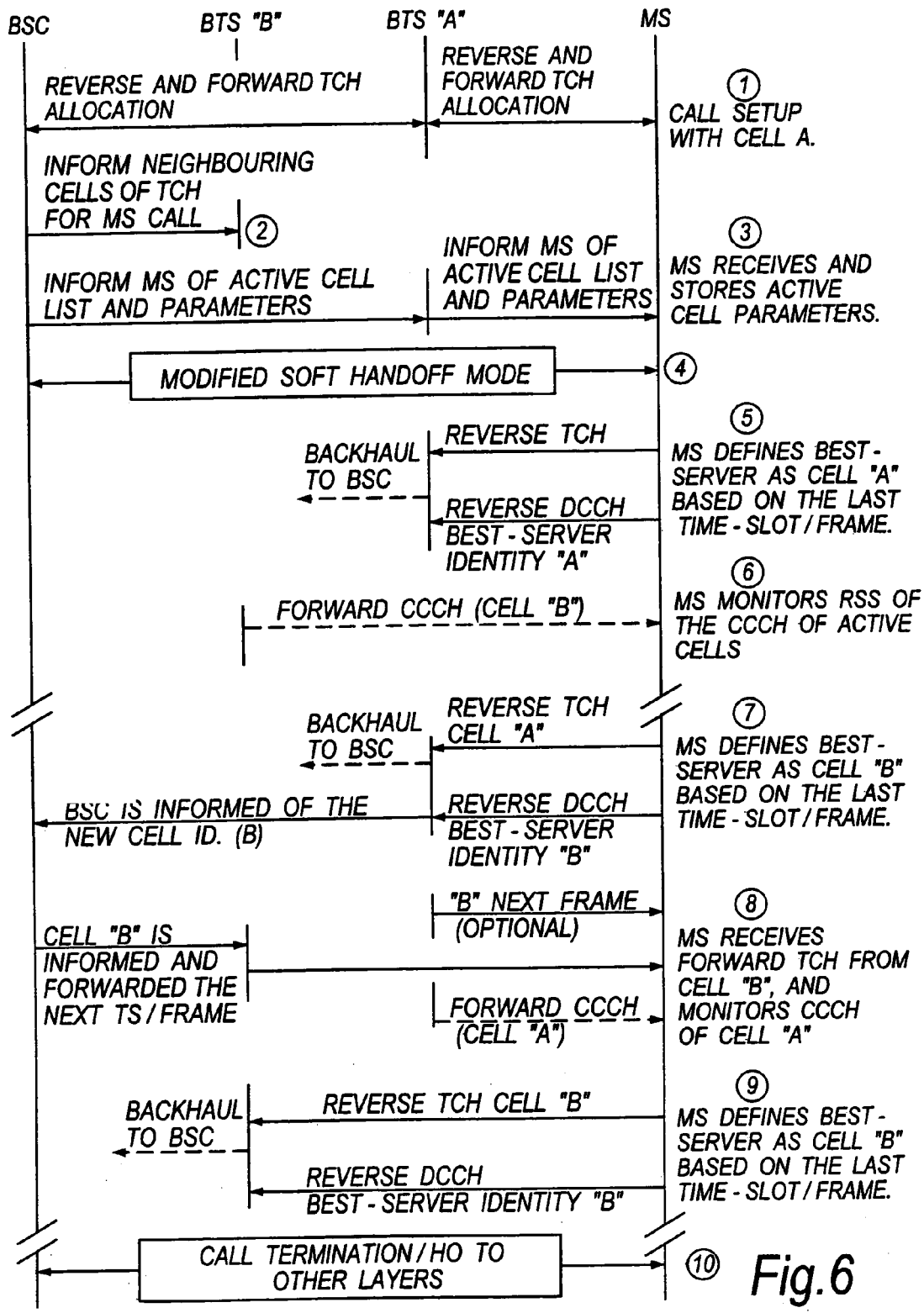
FIG. 6 shows a sequence of steps in a soft handoff operation in a cellular communications network embodying the present invention.

A first difference between the FIG. 6 procedure and the conventional procedure of FIG. 5 is that, as soon as a call has been set up for a particular MS, that MS operates continuously in a soft hand-off mode with a current best-server cell and a preferred set of neighbouring cells. Thus, in the FIG. 6 procedure, when a call is set up (the call may be MS-originated or MS-terminated), the network sets up the call in the soft hand-off mode with the preferred set of neighbouring cells as well as with the current best-server cell.

In the case of the current best-server cell (cell A), as in the conventional call setup process, respective forward and reverse traffic channels TCH are allocated between the base station controller BSC and the base station BTS A and between the base station BTS A and the mobile station MS (step 1).

In step 2, however, as a further part of the call setup process, the network (BSC) informs the remaining cells of the preferred set (in this case cell B) of the call that has been set up with the mobile station. The information sent to the cells of the preferred set includes all the information (such as the service rate, the channelisation codes etc) needed for call set-up.

Incidentally, as described later in more detail it is possible to assign a particular set of channelisation and scrambling codes to each mobile station, which set is applicable to the mobile station concerned wherever it is located in the microcellular network. This is possible in the proposed European wideband CDMA (W-CDMA) system (UTRA) because in UTRA each BTS can have a number of scrambling codes. In this case, because the set of channelisation and scrambling codes assigned to any particular mobile station is known to the network in advance, the amount of information which needs to be transferred between the mobile station and the network at the time of call set-up can be reduced significantly, reducing latency associated with the call set-up process.

In step 3, the network transfers to the current best-server cell A a list (the "active cell list") of the cells of the preferred set of neighbouring cells (i.e. the cells which are to be involved in the soft hand-off operation)—in this case cell B only. For each such involved cell the network informs the best-server cell A of the information, such as scrambling codes, necessary for communication with each remaining cell of the active set.

The current best-server cell A forwards the active cell list and associated information to the mobile station which receives and stores the list and information. Again, if the mobile station is assigned the same set of channelisation and scrambling codes for use throughout the microcellular network, the amount of information which needs to be transferred in step 3 is reduced significantly.

After the call has been set up in this way (step 4) the mobile station is operating in a "modified" soft hand-off mode with the current best-server cell and the cells of the preferred set. This modified soft hand-off mode differs from the soft hand-off mode in FIG. 5 in that only the current best-server cell (cell A) is initially in communication with the mobile station. The remaining cells (cell B) do not initially transmit or receive any information from the mobile station, until notified by the network that they should do so. Thus, these remaining cells may be referred to as "dormant" cells.

The mobile station, which is in communication only with the one best-server cell (cell A), continuously monitors a CCCH (such as the broadcast control channel BCCH or the synchronisation channel SCH) of all of the presently-dormant cells involved in the hand-off operation (i.e. cell B). For example, the received signal strength (RSS) of the CCCH may be measured. In each monitoring period (which may be a frame or even a timeslot within a frame the mobile station selects the best-serving cell based on the measurements taken in the preceding monitoring period. In step 5, for example, the mobile station selects cell A as still being the best-server cell and transmits an uplink control message (UCM) via a reverse dedicated control channel DCCH (e.g. the dedicated physical control channel DPCCH in a UTRA system, as shown in FIG. 6). This uplink control message identifies the best-server cell selected by the mobile station.

The uplink control message UCM identifying the best-server cell is preferably interleaved and/or encoded to protect the information content thereof.

At some point during operation in the modified soft hand-off mode, the mobile station selects one of the dormant cells as being the new best-server cell. Thus, in step 7 in this example, the mobile station identifies the dormant cell B as being the new best-server cell. A UCM providing the identity of cell B is then transmitted via the reverse DPCCH to the existing best-server cell A.

At the existing best-server cell A, the identity of the new best-server cell provided by the UCM is compared with the cell's own identity. If it is different, the existing best-server cell sends a new best-server message (NSM) to the BSC to inform it of the identity of the new best-server cell. Optionally, the existing best-server cell A also sends a downlink control message to the mobile station to confirm that the mobile station should expect to receive the next frame from the new best-server cell B. Cell A then changes from the active state to the dormant state. From now on, the mobile station monitors the CCCH of the dormant cell A.

In step 8, the BSC sends cell B an active status message (ASM) informing it that it is the new best-server cell for the mobile station concerned. Cell B is therefore forwarded the next downlink frame for transmission to the mobile station. This frame is not forwarded to the former best-server cell A which is now in the dormant state (not in communication with the mobile station).

It will be appreciated that, as all of the mobile station information was supplied to all of the cells of the preferred set (initially-dormant cells) at the time the call was set up, the required messaging for hand-off is minimal. Because of this it is possible to identify a new best-server cell in one frame and make the switch to that cell for the next frame. Such a switch is possible even if a different set of channelisation and scrambling codes applies to the mobile station when in communication with the next best-server cell.

Operation continues (step 9) with the mobile station in communication with the identified best-server cell B.

Since the power-budget hand-off is based on common control channel CCCH transmit powers, the new cell B initially transmits with the same power setting (difference between the CCCH power level and the forward traffic channel TCH power level) as the former best-server cell A. The mobile station is, of course, however, now under power control from the new cell.

Fast acquisition of the mobile station or the new best-server BTS is not problematic as the cells are very small in a microcellular environment, and the delay difference between the different BTSs involved in the soft hand-off are minimal (less than one chip period).

The modified soft hand-off mode continues until the call is terminated or handed to a different layer (for example control could be transferred to a "picocell" with a different frequency from the microcell) in step 10.

The FIG. 6 procedure offers the following advantages over the FIG. 5 procedure.

1. Faster Neighbouring Cell Signal Strength Measurements

Unlike the FIG. 5 procedure, which requires a long averaging time prior to cell selection, the selection of the new best server cell in the FIG. 6 procedure can be carried out in each frame. The ability to track fast fading is particularly desirable in microcells, for which the fast-fading nulls can be as far apart as 20 wavelengths. Accordingly, the FIG. 6 procedure can cope adequately with shadowing in the microcellular environment.

2. Avoidance of Neighbouring Cell Signal Strength Measurement Messages

In the FIG. 6 procedure the cell selection is carried out in the mobile station. The mobile station only needs to transmit the identity of the selected best-server cell. For example, a four bit word (three bits with one parity check bit) can be used to select amongst up to eight different cells. This represents far less overhead than that associated with the neighbouring cell measurement reports in the FIG. 5 procedure. In addition, latency is further reduced because the message identifying the best-server cell, being short, does not need to be interleaved over a number of frames as in the case of the FIG. 5 reports.

3. Reduced Pre Soft Hand-Off Signalling Between the Existing Best-Server Cell and the Mobile Station The only signalling required between the current best-server cell and the mobile station relates to on-going UCMs (cell selection messages) identifying the best-server cell. After the identification of a new best-server cell by the mobile station, a short cell selection message (e.g. four-bit word) is required for hand-off.

4. Avoidance of Pre Soft Hand-Off Signalling Between the New Best-Server Cell and the Mobile Station As the new best-server BTS has all of the required channel allocation information and other information associated with the mobile station's existing call, and as the mobile station has already been notified of all of the details of the BTSs in the active cell list, there is no requirement for additional signalling between the mobile station and the new best-server BTS when selecting the new best-server BTS.

5. Neighbouring Cell Signal Strength Measurements and Messaging

In the FIG. 5 soft hand-off procedure the signal strength measurements require averaging over several frames, which delays the selection of the new best-server cell. Also, the measurement reports, being relatively long and requiring data accuracy, require encoding and/or interleaving, which introduces further latency. These problems are eliminated in the FIG. 6 procedure, for the reasons indicated at (1) and (2) above.

6. Avoidance of Post Soft Hand-Off Signalling Between Former Best-Server Cell and Mobile Station Unlike the FIG. 5 soft hand-off procedure, the FIG. 6 procedure does not require hand-off completion messages and no signalling is required between the mobile station and the former best-server cell.

7. Reduced Signalling in the Fixed Network

The signalling requirements in the fixed network are minimal, particularly in the case in which the same BSC is serving all of the active BTSs involved in the soft hand-off operation. Once the BSC is informed (by the current best-server cell) of the identity of the next best-server cell, the next downlink transmit frame (or possibly timeslot) is transmitted to the appropriate BTS, triggering the transmit and receive sequences.

8. Reduced Fixed-Network Backhaul

The FIG. 5 soft hand-off procedure requires constant communication with a number of cells which leads to excessive backhaul requirements in the fixed network. In comparison, the FIG. 6 soft hand-off procedure reduces network backhaul considerably.

It will be appreciated that the continuous uplink signalling (UCMs) required for the best-server cell identification in the FIG. 6 procedure will reduce the uplink capacity of the network. The degree of capacity loss depends on the services active in the network. However, most circuit-switched services such as voice and video are downlink-capacity-limited. Accordingly, it is generally expected that the FIG. 6 procedure will result in an overall capacity gain in the network.

Figure 7:
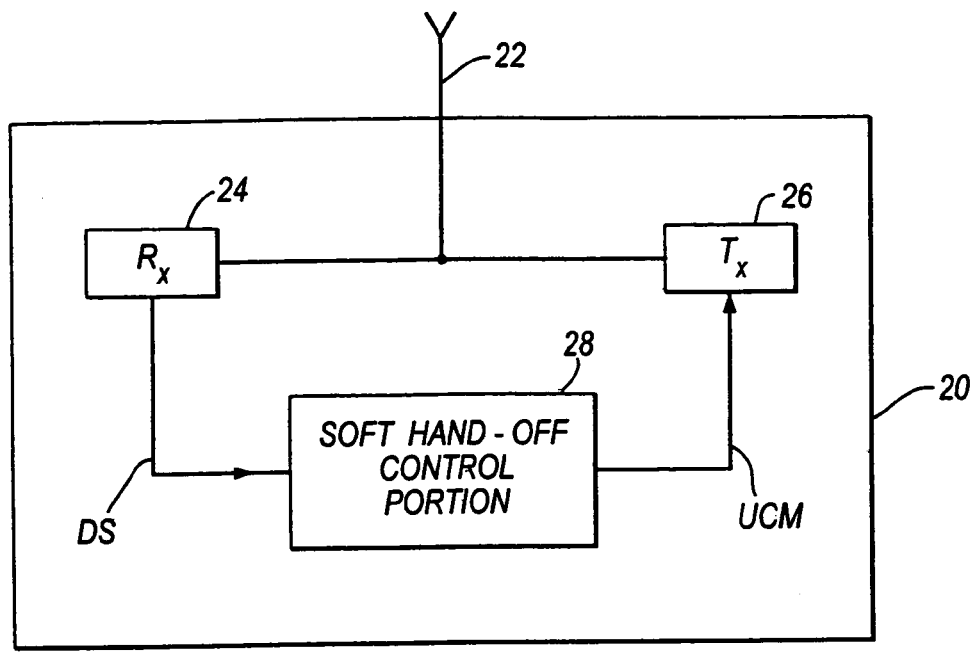
FIG. 7 shows parts of a mobile station embodying the present invention.

FIG. 7 shows parts of a mobile station for use in an embodiment of the invention. The mobile station 20 has an antenna portion 22 connected (e.g. via a duplexer—not shown) to a receiver portion 24 and a transmitter portion 26. The mobile station 40 also includes a soft hand-off control portion 28 which receives from the receiver portion 24 a downlink signal DSi from the or each BTS with which the MS 20 is currently in communication. The soft hand-off control portion 28 also applies an uplink control message UCM to the transmitter portion 26.

Figure 8:
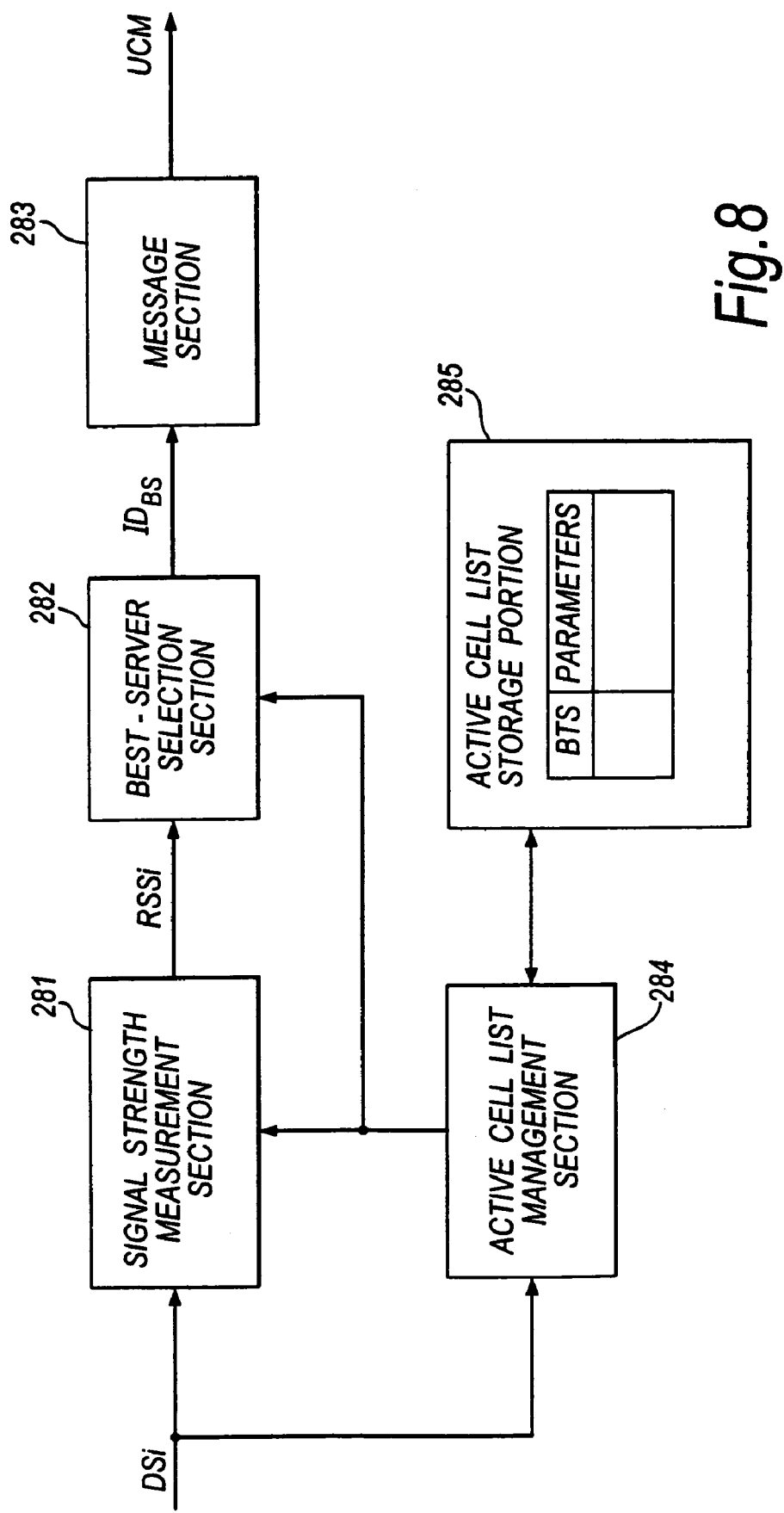
FIG. 8 shows in detail one of the parts of the FIG. 7 mobile station.

One example of the constitution of the soft hand-off control portion 28 in the FIG. 7 mobile station is shown in FIG. 8.

In FIG. 8, the soft hand-off control portion 28 comprises a signal strength measurement section 281, a best-server selection section 282, a message section 283, an active cell list management section 284 and an active cell list storage portion 285.

In step 3 of the FIG. 6 procedure, the mobile station receives from the currently-serving BTS (BTS A) the list of active cells, and their associated parameters. This information is detected, in one of the downlink signals received by the mobile station from BTS A, by the active cell list management section 284 and is stored in the active cell list storage portion 285.

In steps 4 to 9 of the FIG. 6 procedure, when the mobile station is operating in the modified soft hand-off mode, the signal strength measurement section 281 is supplied by the active cell list management section 284 with the identity of each cell in the active list stored in the active cell list storage portion. For each such active cell, the signal strength measurement section 281 performs a measurement of the received signal strength RSS of the CCCH of the active cell concerned. The measurement may be performed, for example, over a frame or over part of a frame such as a time slot.

The resulting received signal strength measure RSSi for each of the active cells (here i is the number of the cell in the active set) is supplied from the signal strength measurement section 281 to the best-server selection section 282 which compares the RSS measures for the different active cells and determines which of the active cells is currently the best-server cell.

The identity $ID_{BS}$ of the determined best-server cell is then supplied by the best-server selection section 282 to the message section 283. The message section 283 formulates an uplink control message for transmission by the transmitter portion 26 in the mobile station 20 to the current best-server cell. This uplink control message may be encoded and/or interleaved, if required, to improve data transmission integrity.

It will be appreciated that it is not essential for the selection of the best-server to be based on a RSS measure. It would be possible alternatively to base the selection on some other measure such as signal-to-interference ratio (SIR) of each active cell or on a combination of different measures (e.g. RSS and SIR).

It would also be possible for the signal strength measurement section 281 to include a storage portion enabling it to store a past history of the RSS (and/or SIR) measures for the different BTSs in the active set. In this case, it would be possible for the best-server selection section 282 to employ more sophisticated decision-making in relation to the best-server selection so as to avoid undesirable effects caused by temporary reception phenomena or other problems caused by too-frequent changing of the BTS selection.

When a new best-server cell is selected by the best-server selection section 282 the active cell list management portion 284 retrieves from the active cell list storage portion 285 the call setup information applicable to the new best-server cell, as received earlier at the time the call was setup. This enables the mobile station to activate the uplink and downlink channels for communication with the new best-server cell very quickly, without the need for channel negotiation etc.

Figure 9:
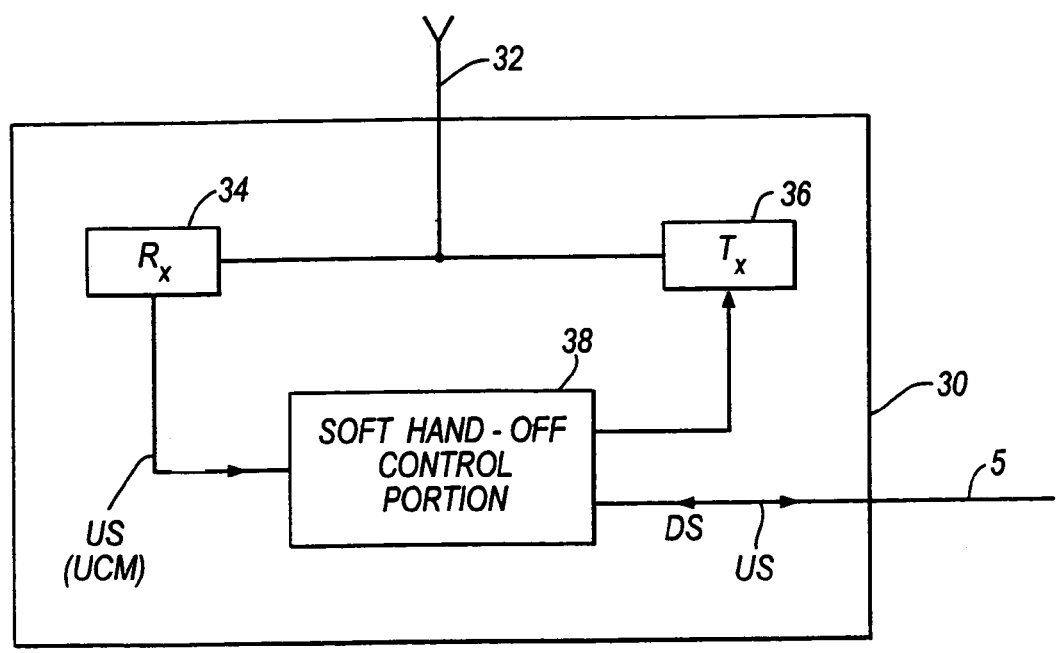
FIG. 9 shows parts of a base transceiver station embodying the present invention.

FIG. 9 is a block diagram showing parts of a BTS 30 for use in an embodiment of the present invention. The BTS 30 is specially adapted to receive and process the call setup information of step 2 of the FIG. 6 procedure and the uplink control message UCM sent by the MS 20 in steps 5, 7 and 9 of the FIG. 6 procedure.

An antenna element 32 is connected (e.g. via a duplexer—not shown) to a receiver portion 34 and a transmitter portion 36. A soft hand-off control portion 38 receives uplink signals US from the receiver portion 34, and forwards the received uplink signals US (or signals derived therefrom) to the fixed network 5 for transmission to the BSC. The soft hand-off control portion 38 also receives downlink signals DS from the BSC and selectively forwards the received downlink signals DS (or signals derived therefrom) to the transmitter portion 36 for transmission to mobile stations in the cell area covered by the BTS 30.

FIG. 10 shows one example of the constitution of the soft hand-off control portion 38 in FIG. 9.

The soft hand-off control portion 38 comprises a forwarding control section 381 having a downlink portion 382 and an uplink portion 383, a call setup information processing section 384, a call setup information storage section 385, an uplink control message processing section 386, a best-server comparison section 387, an active/dormant status control section 388 and a new best-server informing section 389.

As described previously, when a call is set up, not only is the current serving cell (cell A) involved in the call setup process, but so is each neighbouring cell in the predetermined active set of cells (cell B). Thus, if the BTS 30 is the BTS of such a neighbouring cell, in step 2 of the FIG. 6 procedure the call setup information processing section 384 of the BTS receives from the BSC call setup information for the call being set up. The call setup information could be used in the dormant BTS at this stage for radio resource control purposes and other statistical purposes, but is otherwise simply stored in the call setup information storage section 385 for possible later use.

Following storage of the call setup information the active/dormant status control section 388 places the BTS in the dormant state. In this state, no transmitter or receiver resources are allocated in the BTS to the mobile station.

If the BTS 30 is the BTS of the currently-serving cell when the call is set up (cell A), in step 3 of the FIG. 6 procedure the call setup information processing section 384 causes the active cell list and associated parameters, received from the BSC, to be forwarded via the forwarding control section 381 to the transmitter portion 36 for transmission to the mobile station.

When the BTS 30 is in the active state the uplink control message processing section 386 monitors the reverse DCCH from the mobile station and detects when an uplink control message UCM is included therein. When such a UCM is detected, the uplink control message processing section processes the message to derive therefrom the identity $ID_{BS}$ of the best-server cell identified by the mobile station. The best-server identity $ID_{BS}$ is compared with the BTS's own ID. The results of the comparison are transferred to the active/dormant status control section 388.

In the active/dormant status control section 388, switching between the active and dormant states is performed as follows. If the BTS is in the active state, and the derived $ID_{BS}$ does not match the BTS's own ID, the active/dormant status control section 388 determines that a new best-server cell has been selected by the mobile station. In this case, it switches the BTS to the dormant state and applies a control signal to the new best-server informing section 389 which transmits a new server message (NSM) to the BSC informing the BSC of the identity $ID_{BS}$ of the new best-server cell.

If, on the other hand, the BTS 30 is in the dormant state, its receiver portion 34 will not be in communication with the mobile station and so in this case the active/dormant status control section 388 is informed by an active state message ASM supplied by the BSC that it should enter the active state. In this case, the downlink and uplink portions 382 and 383 of the BTS are activated to forward uplink and downlink signals between the BSC and the MS concerned.

Next, a further aspect of the present invention will be described with reference to FIGS. 11 and 12.

Almost all existing and proposed future cellular mobile communications networks work on the principle that a mobile station can move through the network whilst maintaining a connection to an end application. This means that, from time to time, a mobile station needs to perform a hand-off from one cell to another cell. This usually leads to a change in the communication "channel" between the mobile station and the network. This change has historically been required since frequency re-use was required between adjacent cells. Thus, a mobile handing off between two cells had to change its transmit and/or receive carrier frequency; this carrier frequency effectively defined the communication channel. However, with the advent of new cellular networks that are based on spread-spectrum modulation, for example. IS95 and W-CDMA, frequency reuse is no longer required, and all cells operate at the same carrier frequency. However, even in such systems, hand-off between two adjacent cells still results in the mobile station changing its communication channel which is now defined in terms of one or more codes.

The requirement to change channels when performing hand-off often requires considerable signalling in the interface, causes latency and reduces the reliability of the network.

Figure 11:
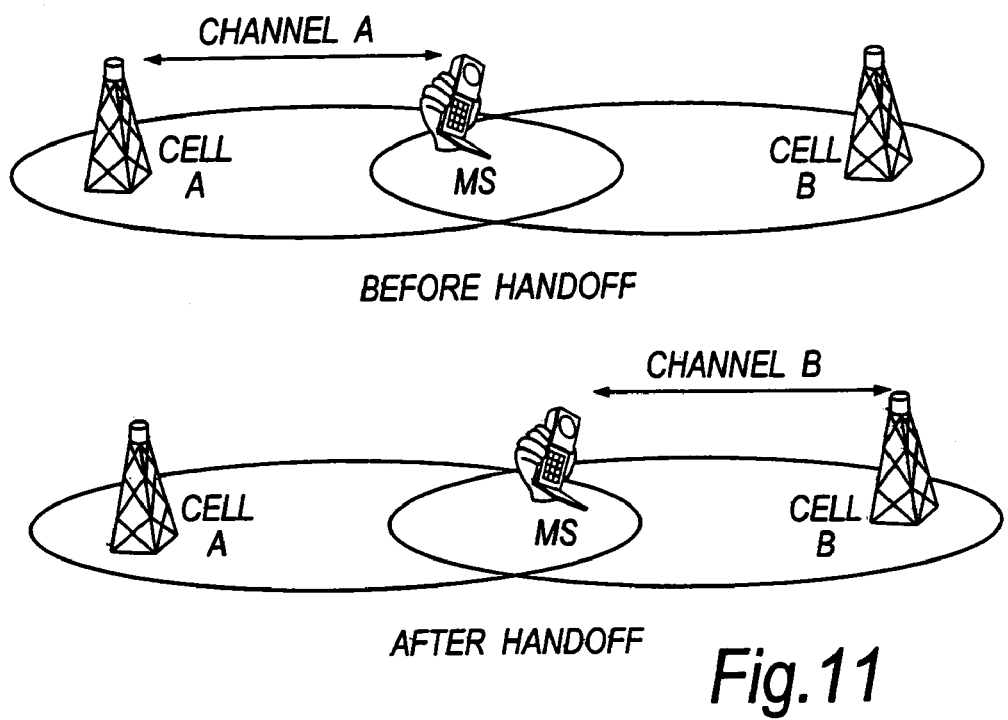
FIG. 11 shows a schematic view of a conventional cellular communications network.

FIG. 11 illustrates a two-cell cellular network. In this network, the communication channels used in each cell are associated with the cell concerned and are defined as a property of that cell. The communication channel for the cell can be defined in terms of:
- a carrier frequency in analog systems;
- a carrier frequency and a timeslot in GSM systems;
- a set of carrier frequencies, a timeslot and a hopping sequence in GSM systems with frequency hopping; and
- a channelisation, spreading or scrambling code (or any combination of these codes) in a direct spreading code-division multiple access (DS-CDMA) system.

Apart from the above types of channel definitions, a channel can be defined as any appropriate combination of frequency, time, code and other parameters that can distinguish between different multiple-access users.

In a soft hand-off operation in the FIG. 11 network, cells A and B need to share the same communications channel in the uplink direction, as the mobile station MS is normally capable of transmitting on one communication channel only. This shared channel is also the property of one of the cells (A or B) with the other cell being allowed only momentarily to access the channel. In the downlink direction, each cell uses a different communication channel for transmitting the same information, and the mobile station decodes each channel individually.

Figure 12:
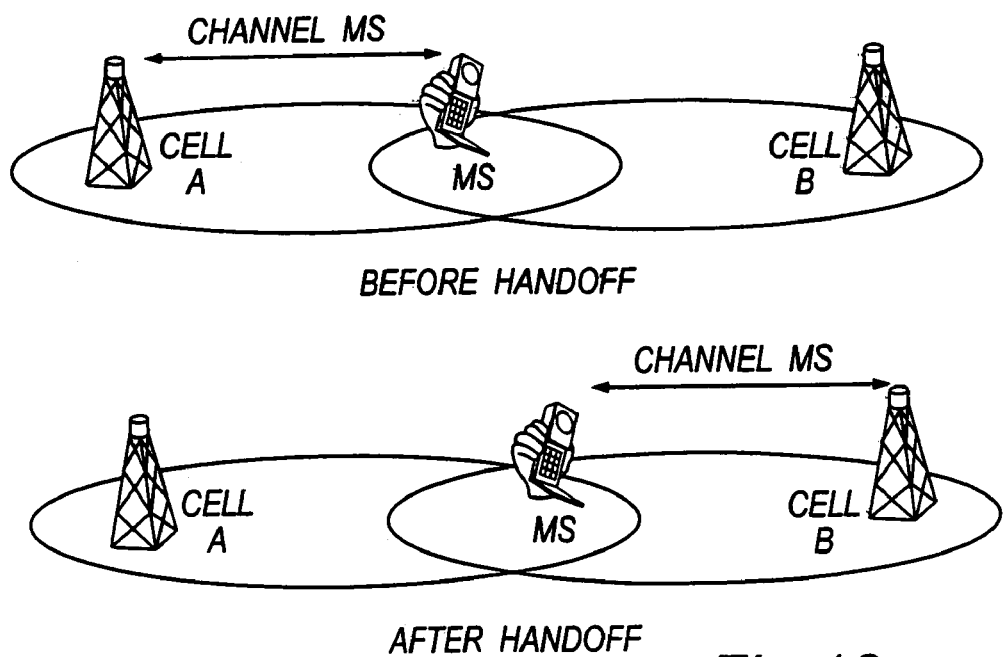
FIG. 12 shows a schematic view of a cellular communications network embodying a further aspect of the present invention.

FIG. 12 illustrates a cellular network embodying the above-mentioned further aspect of the invention. In this network, each mobile station active in the network is assigned its own individual communication channel. This means that the channel is now the property of the mobile station and can be-used anywhere in the network, in any given cell. The channel can be assigned at the time of call setup (and communicated to each, or each nearby, BTS of the network at that time) and generally will not change throughout the duration of the call, no matter how many different cells the mobile station communicates with. During a hand-off operation, the network directs the new serving base stations to use the communication channel assigned to the mobile station. No information needs to be sent to the new serving base stations by the network to identify the communication channel to use for communication with the mobile station, as this information is known to all the BTSs from the call setup process.

It may occasionally be necessary for the channel assigned to a particular mobile station to be changed during the course of a call, for example because its original channel is already in use at a particular cell. In this case, it would be necessary for the network to inform all of the BTSs of the changed channel.

For example, take a situation in which a mobile station in cell B is using channel 1 (spreading code 1) and scrambling code 1 in the downlink direction. Another mobile station, initially in cell A, is using channel 1 (spreading code 1) but scrambling code 2 (code set [1,2]). When that other mobile station moves into a soft hand-off region between cells A and B, the BTS in cell B uses channel 1 and scrambling code 2 to communicate with it, but this means that some cross-correlation occurs between the code sets of the two mobile stations using spreading code 1 in code B, leading to multi-use interference. For this reason, in view of the existing use in cell B of the code set [1,1], after the mobile station moves into cell B and soft hand-off is completed, a so-called "intra-cell" hand-off is performed to change the channel that mobile station to the code set [2,1], so as to restore orthogonality between the code sets assigned to the two mobile stations.

The assignment of a specific channel to the mobile station for use across the network is also applicable in soft hand-off as only one pair of uplink and downlink channels is required for simultaneous communication with several BTSs.

The assignment of a specific set of codes to a mobile station is readily possible in the proposed European wideband CDMA system (UTRA) which has several scrambling codes defined per cell (multi-identity cell). These scrambling codes can be paired with channelisation codes of the orthogonal variable spreading factor (OVSF) tree to give a large range of available code-sets for use in picocells or microcells.

In the case in which the channel(s) is/are allocated at the time of call set-up, the assigned channel(s) may be only used for a part of the call duration and then a switch may be made to another channel(s) to continue the call. This can enable a call to be commenced on the micro/picocell layer of the network and continue on the macrocell layer of network.

Similarly, in a case in which normal hand-off (or soft hand-off) is used, the assigned channels can be kept whilst traversing through several cells and continuing the call (i.e. a scenario in which a call is commenced on the macrocell layer of the network and then gets handed to a micro/picocell layer). Furthermore, rather than terminating the call in the micro/picocell layer it is possible for the call to be handed back to the macrocell layer before finishing the call. Multiple hops between layers can occur in this way during a call.

The invention claimed is:

1. A cellular communications network comprising:
   a call setup portion operable, in a call setup process for setting up a call for a mobile station of the network, to allocate respective uplink and downlink channels between the mobile station and a first one of a plurality of base transceiver stations of the network, and to provide the mobile station and at least one further base transceiver station of said plurality, neighboring said first base transceiver station, with call setup information for use by the mobile station and the or each said further base transceiver station to allocate respective uplink and downlink channels between the further base transceiver station concerned and the mobile station; and
   a hand-off control portion operable initially, upon completion of the call setup process, to set said first base transceiver station to an active state, in which its said uplink and downlink channels are in use, and to set the or each said further base station to a dormant state in which the uplink and downlink channels of the further base transceiver station concerned are not in use, the hand-off control portion also being operable when, during the course of the call, it is determined that the mobile station should communicate with the, or one of the, further base transceiver stations, to employ such call setup information provided in the call setup process to bring about change of that further base transceiver station from said dormant state to said active state;
   an uplink control message receiving portion operable, when the first base transceiver station is in the active state, to detect, in an uplink signal transmitted by the mobile station to the first base transceiver station, an uplink control message identifying a base transceiver station of the network with which the mobile station requests communication;
   a comparison portion which compares the identity of the requested base transceiver station specified by the received uplink control message with an own base transceiver station identity of the first base transceiver station;
   a status control portion which changes the first base transceiver station from said active state to said dormant state if the requested base transceiver station identity is different from said own base transceiver station identity; and
   a new base transceiver station informing portion operable, when the requested base transceiver station identity is different from said own base transceiver station identity, to send to a base station controller of the network a message specifying the requested base transceiver station identity.

2. A network as claimed in claim 1, wherein said hand-off control portion is operable to identify a single base transceiver station that is to communicate with the mobile station at any one time during the course of said call.

3. A network as claimed in claim 2, wherein said hand-off control portion is operable, when causing one of the base transceiver stations to change from said dormant state to said active state, to cause the base transceiver station that is currently in the active state to change to the dormant state.

4. A network as claimed in claim 1, wherein said call setup portion is operable, in said call setup process, to cause the mobile station and the or each said further base transceiver station to exchange channel negotiation signaling for allocating said uplink and downlink channels there between.

5. A network as claimed in claim 1, wherein said call setup information provided to the or each further base transceiver station and/or to the mobile station comprises one or more of the following:
service rate, channelization code(s), scrambling code(s) of the uplink and/or downlink channels.

6. A network as claimed in claim 1, wherein said hand-off control portion comprises:
a monitoring portion, included in said mobile station, which provides respective signal measures for said first base transceiver station and the or each further base transceiver stations, each signal measure serving to indicate the performance of a communications channel between the mobile station and the base transceiver station concerned; and
a base transceiver station selection portion which determines, in dependence upon said signal measures, with which of the base transceiver stations the mobile station should communicate.

7. A network as claimed in claim 6, wherein said base transceiver station selection portion is also provided in the mobile station, and the mobile station is operable to include, in one more uplink signals transmitted thereby, and uplink control message identifying one of the base transceiver stations with which the mobile station requests communication.

8. A network as claimed in claim 7, wherein the mobile station transmits such an uplink control message in each frame of the channel signals between the mobile station and the base transceiver station with which it is in communication.

9. A network as claimed in claim 8, wherein said uplink control message transmitted in each frame identifies the base transceiver station determined in dependence upon the signal measures produced based on the communications-channel performance in the preceding frame.

10. A network as claimed in claim 6, wherein said monitoring portion produces said signal measure for each base transceiver station based on a monitoring period of no longer than one frame of said communications channel.

11. A network as claimed in claim 6 wherein, for the or each said base transceiver station that is in said dormant state, said signal measure indicates the performance of a downlink common control channel from the base transceiver station concerned to the mobile station.

12. A network as claimed in claim 1, wherein the same uplink channel and/or the same downlink channel is/are assigned by the network to the mobile station for use in communicating with two or more of said base transceiver stations of said plurality.

13. A network as claimed in claim 12, being a code-division multiple-access network, wherein the same set of codes is assigned to the mobile station for the uplink and/or downlink channels between it and two or more of said base transceiver stations of the network.

14. A network as claimed in claim 1, wherein the assignment to the mobile station of said same uplink channel and/or downlink channel is made when a call is set up between the network and the mobile station, and the same assigned channel(s) is/are used by the mobile station for communication with different base transceiver stations of said plurality for all or part of the duration of the call.

15. A base transceiver station, for use in a cellular communications network, comprising:
a call setup information receiving portion operable, in a call setup process for setting up a call between the network and a mobile station of the network tat is currently being served by another base transceiver station of the network neighboring the claimed base transceiver station, to receive call setup information relating to the call, for use by the claimed base transceiver station to allocate respective uplink and downlink channels between it and the mobile station;
a call setup information storage portion which stores the received call setup information;
a hand-off control portion operable initially, following completion of said call setup process, to maintain the claimed base transceiver station in a dormant state, in which said uplink and downlink channels are not in use, and, when it is determined by the network that the mobile station should communicate with the claimed base transceiver station, to employ the stored call setup information received in the call setup process to change the base transceiver station from said dormant state to an active state in which its said uplink and downlink channels are in use;
an uplink control message receiving portion operable, when the claimed base transceiver station is in the active state, to detect, in an uplink signal transmitted by the mobile station to the claimed base transceiver station, an uplink control message identifying a base transceiver station of the network with which the mobile station requests communication;
a comparison portion which compares the identity of the requested base transceiver station specified by the received uplink control message with its own base transceiver station identity;
a status control portion which changes the claimed base transceiver station from said active state to said dormant state if the requested base transceiver station identity is different from said own base transceiver station identity; and
a new base transceiver station informing portion operable, when the requested base transceiver station identity is different from said own base transceiver station identity, to send to a base station controller of the network a message specifying the requested base transceiver station identity.

16. A communications method for use in a cellular mobile communications network, comprising:
in a call setup process, for setting up a call for a mobile station of the network, allocating respective uplink and downlink channels between the mobile station and a first one of a plurality of base transceiver stations of the network, and providing the mobile station and at least one further base transceiver station of said plurality, which further base transceiver station neighbors said first base transceiver station, with call setup information for use by the mobile station and the or each said further base transceiver station to allocate respective uplink and downlink channels between the further base transceiver station concerned and the mobile station;
after completion of the call setup process, initially setting the first base transceiver station to an active state, in which said uplink and downlink channels between it and the mobile station are in use, arid setting the or each further base transceiver station to a dormant state, in which said uplink and downlink channels between the further base transceiver station concerned and the mobile station are not in use;

when, during the course of the call, it is determined that the mobile station should communicate with the, or one of the, further base transceiver stations, employing such call setup information provided in the call setup process to bring about change of that further base transceiver station from said dormant state to said active state;

when the first base transceiver station is in the active state, detecting, in an uplink signal transmitted by the mobile station to the first base transceiver station, an unlink control message identifying a base transceiver station of the network with which the mobile station requests communication;

comparing the identity of the requested base transceiver station specified by the received uplink control message with an own base transceiver station identity of the first base transceiver station;

changing the first base transceiver station from said active state to said dormant state if the requested base transceiver station identity is different from said own base transceiver station identity; and when the requested base transceiver station identity is different from said own base transceiver station identity, sending to base station controller of the network a message specifying the requested base transceiver station identity.

17. A cellular communications network in which the same uplink channel and/or the same downlink channel is/are assigned by the network to a mobile station of the network for use in communicating with a plurality of base transceiver stations of the network, and the mobile station uses that/those same assigned channel(s) both before and after a hand-off operation in which the mobile station is handed off from one base transceiver station of said plurality to another base transceiver station of said plurality, said network comprising:

an unlink control message receiving portion operable, when the one base transceiver station is in the active state, to detect, in an uplink signal transmitted by the mobile station to the one base transceiver station, an uplink control message identifying a base transceiver station of the network with which the mobile station requests communication;

a comparison portion which compares the identity of the requested base transceiver station specified by the received uplink control message with an own base transceiver station identity of the one base transceiver station;

a status control portion which changes the one base transceiver station from said active state to said dormant state if the requested base transceiver station identity is different from said own base transceiver station identity; and a new base transceiver station informing portion operable, when the requested base transceiver station identity is different from said own base transceiver station identity, to send to a base station controller of the network a message specifying the requested base transceiver station identity.

18. A network as claimed in claim 17, being an analog network, wherein the same carrier frequency is assigned to the mobile station for communication in the uplink and/or downlink direction with all of the base stations of said plurality.

19. A network as claimed in claim 17, being a Global System for Mobile Communication (GSM) network, wherein the same carrier frequency and the same time slot is assigned to the mobile station for communication in the downlink direction and/or uplink direction with all of the base transceiver stations of said plurality.

20. A network as claimed in claim 17, being a Global System for Mobile Communication (GSM) network employing frequency hopping, wherein the same set of carrier frequencies and the same time slot and the same hopping sequence is assigned to the mobile station for communication in the uplink direction and/or downlink direction with all of the base transceiver stations of said plurality.

21. A network as claimed in claim 17, being a code-division multiple access (CDMA) network, wherein the same set of codes is assigned to the mobile station for use in communicating in the uplink direction and/or downlink direction with all of the base transceiver stations of said plurality.

22. A network as claimed in claim 17, wherein the assignment to the mobile station of said same uplink channel and/or downlink channel is made when a call is set up between the network and the mobile station, and the same assigned channel(s) is/are used by the mobile station for communication with different base transceiver stations of said plurality for all or part of the duration of the call.

23. A network as claimed in claim 17, wherein the same uplink channel and/or the same downlink channel is/are assigned by the network to the mobile station for use in communicating with substantially all of the base transceiver stations of the network.

24. A network as claimed claim 17, wherein the or each assigned channel is a traffic channel.

25. A network as claimed in claim 17, wherein said hand-off operation is a soft hand-off operation in which said mobile station is in communication with more than one base transceiver station of the network.

26. A cellular communications network comprising:

call setup means operable, in a call setup process for setting up a call for a mobile station of the network, to allocate respective uplink and downlink channels between the mobile station and a first one of a plurality of base transceiver stations of the network, and to provide the mobile station and at least one further base transceiver station of said plurality, neighboring said first base transceiver station, with call setup information for use by the mobile station and the or each said further base transceiver station to allocate respective uplink and down-link channels between the further base transceiver station concerned and the mobile station; and hand-off control means operable initially, upon completion of the call setup process, to set said first base transceiver station to an active state, in which its said uplink and downlink channels are in use, and to set the or each aid further base station to a dormant state in which the uplink and downlink channels of the further base transceiver station concerned are not in use, the hand-off control means also being operable when, during the course of the call, it is determined that the mobile station should communicate with the, or one of the, further base transceiver stations, to employ such call setup information provided in the call setup process to bring about change of that further base transceiver station from said dormant state to said active states;

uplink control message receiving means operable, when the first base transceiver station is the active state, to detect, in an uplink signal transmitted by the mobile station to the first base transceiver station, an uplink control message identifying a base transceiver station of the network with which the mobile station request communication;

comparison means which compares the identity of the requested base transceiver station specified by the received uplink control message with an own base transceiver station identity of the first base transceiver station;

status control means which changes the first base transceiver station from said active state to said dormant state if the requested base transceiver station identity is different from said own base transceiver station identity; and new base transceiver station informing means operable, when the requested base transceiver station identity is different from said own base transceiver station identity, to send to a base station controller of the network a message specifying the requested base transceiver station identity.

27. A base transceiver station, for use in a cellular communications network, comprising:

call setup information receiving means operable, in a call setup process for setting up a call between the network and a mobile station of the network that is currently being served by another base transceiver station of the network neighboring the claimed base transceiver station, to receive call setup information relating to the call, for use by the claimed base transceiver station to allocate respective uplink and downlink channels between it and the mobile station;

call setup information storage means for storing the received call setup information; and hand-off control means operable initially, following completion of said call setup process, to maintain the claimed base transceiver station in a dormant state, in which said uplink and downlink channels are not in use, and, when it is determined by the network that the mobile station should communicate with the claimed base transceiver station, to employ the stored call setup information received in the call setup process to change the base transceiver station from said dormant state to an active state in which its said uplink and downlink channels are in use;

uplink control message receiving means operable, when the claimed base transceiver station is in the active state, to detect, in an unlink signal transmitted by the mobile station to the claimed base transceiver station, an uplink control message identifying a base transceiver station of the network with which the mobile station requests communication;

comparison means which compares the identity of the requested base transceiver station specified by the received uplink control message with its own base transceiver station identity;

status control means which changes the claimed base transceiver station from said active state to said dormant state if the requested base transceiver station identity is different from said own base transceiver station identity; and new base transceiver station informing means operable, when the requested base transceiver station identity is different from said own base transceiver station identity, to send to a base station controller of the network a message specifying the requested base transceiver station identity.

* * * * *